United States Patent
Yi et al.

(10) Patent No.: US 11,019,099 B2
(45) Date of Patent: May 25, 2021

(54) METHOD OF APPLICATION MALWARE DETECTION BASED ON DYNAMIC API EXTRACTION, AND READABLE MEDIUM AND APPARATUS FOR PERFORMING THE METHOD

(71) Applicant: Foundation of Soongsil University-Industry Cooperation, Seoul (KR)

(72) Inventors: Jeong Hyun Yi, Seongnam-si (KR); Kichang Kim, Icheon-si (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 40 days.

(21) Appl. No.: 16/515,723

(22) Filed: Jul. 18, 2019

(65) Prior Publication Data
US 2020/0344261 A1 Oct. 29, 2020

(30) Foreign Application Priority Data
Apr. 25, 2019 (KR) .................. 10-2019-0048172

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *H04L 29/06* | (2006.01) | |

(Continued)

(52) U.S. Cl.
CPC .......... *H04L 63/1483* (2013.01); *G06F 9/541* (2013.01); *G06K 9/6259* (2013.01); *G06N 20/00* (2019.01); *H04L 63/1433* (2013.01)

(58) Field of Classification Search
CPC .......... G06F 21/50; G06F 21/51; G06F 21/52; G06F 21/55; G06F 21/56; G06F 9/541; H04W 12/12; H04W 12/1208; G06K 9/6256; G06K 9/6259; G06N 20/00; H04L 63/1433; H04L 63/1441; H04L 63/1483; H04L 63/145; H04L 41/0636
See application file for complete search history.

(56) References Cited

U.S. PATENT DOCUMENTS 10,645,099 B1 * 5/2020 Ciubotariu ............ H04L 63/145
2014/0181973 A1 6/2014 Lee et al.
(Continued)

FOREIGN PATENT DOCUMENTS

| KR | 10-1326896 B1 | 11/2013 |
|---|---|---|
| KR | 10-1589656 B1 | 1/2016 |

(Continued)

*Primary Examiner* — Amie C. Lin
(74) *Attorney, Agent, or Firm* — Novick, Kim & Lee, PLLC; Sang Ho Lee

(57) ABSTRACT

Provided is a method of application malware detection based on dynamic Application Programming Interface (API) extraction, and a readable medium and an apparatus for performing the same. The method of application malware detection based on dynamic API extraction includes generating an API classifier which classifies an input API as malicious or benign using API used in a sample application classified as malicious application apps or benign application apps, and inputting a pre-stored target API into the API classifier to classify the target API as malicious or benign.

8 Claims, 5 Drawing Sheets

(51) Int. Cl.
G06N 20/00 (2019.01)
G06K 9/62 (2006.01)
G06F 9/54 (2006.01)

(56) References Cited

U.S. PATENT DOCUMENTS

2017/0270299 A1* 9/2017 Kim .................. G06N 5/022
2018/0278635 A1* 9/2018 Shin ................. H04L 63/1425
2019/0180029 A1* 6/2019 Copty .................. G06F 21/56

FOREIGN PATENT DOCUMENTS

| KR | 10-1803889 B1 | 12/2017 |
| KR | 10-2018-0107932 A | 10/2018 |
| KR | 10-1907443 B1 | 10/2018 |
| WO | 2017/090194 A1 | 6/2017 |

* cited by examiner

METHOD OF APPLICATION MALWARE DETECTION BASED ON DYNAMIC API EXTRACTION, AND READABLE MEDIUM AND APPARATUS FOR PERFORMING THE METHOD

CROSS-REFERENCE TO RELATED APPLICATIONS

This application claims priority under 35 U.S.C. § 119 to Korean Patent Application No. 10-2019-0048172, filed on Apr. 25, 2019, in the Korean Intellectual Property Office, the disclosure of which is incorporated herein by reference in its entirety.

TECHNICAL FIELD

The present disclosure relates to a method of application malware detection based on dynamic Application Programming Interface (API) extraction, and a readable medium and an apparatus for performing the same, and particularly, to a method of application malware detection based on dynamic API extraction for detecting malware in an Android operating system-based mobile device based on API used in an application running on the mobile device, and a readable medium and an apparatus for performing the same.

BACKGROUND

Methods for evaluating security vulnerability of applications running on mobile devices are usually performed by analysis of permissions requested from the applications, description of the applications and user review.

However, in the case of the permissions requested from the applications, application developers do not know accurately the meaning and influence of the corresponding permissions, and unnecessary permission requests may affect the evaluation irrespective of the actual behaviors of the applications.

The description of the applications is written by the developers' subjective opinions, and the user review is written by plenty of unspecified users and also has low objectiveness, and does not conduct a background service evaluation, failing to fully reflect the behaviors of the applications.

As described above, the conventional application security vulnerability evaluation methods have limitations in accurately reflecting and evaluating the actual behaviors of the applications.

SUMMARY

An aspect of the present disclosure provides a method of application malware detection based on the dynamic Application Programming Interface (API) extraction for detecting malware in an application based on API used in the application to reflect the actual behaviors of the application, and a readable medium and an apparatus for performing the same.

The technical problem of the present disclosure is not limited to the above-mentioned technical problem, and other technical problems not mentioned herein will be clearly understood by those skilled in the art from the following description.

To solve the above-described problem, a method of application malware detection based on dynamic API extraction according to the present disclosure is a malware detection method in a malware detection apparatus for detecting malware in an application by classifying API used in the application as malicious or benign, and includes extracting API used in a sample application classified as malicious application apps or benign application apps and generating an API list, extracting API from the API list according to frequency of occurrence of each API included in the API list in the malicious application apps or the benign application apps and generating a training dataset, using a machine learning algorithm with the training dataset and generating an API classifier which classifies an input API as malicious or benign, and inputting a pre-stored target API into the API classifier to classify the target API as malicious or benign.

Meanwhile, the extracting the API from the API list according to the frequency of occurrence of each API included in the API list in the malicious application apps or the benign application apps and generating the training dataset may include measuring the frequency of occurrence of each API included in the API list in the malicious application apps or the benign application apps according to whether the sample application from which each API included in the API list is extracted is classified as the malicious application apps or the benign application apps, calculating a Mutual Information (MI) value between the frequency of occurrence of each API included in the API list in the malicious application apps and the frequency of occurrence in the benign application apps, and extracting the API that will constitute the training dataset from the API list on the basis of the MI value of each API included in the API list.

Additionally, the method of application malware detection based on dynamic API extraction may further include a step of accessing a reference site of an Android application, collecting feature information including a package name, a class name, an API name and description for each API provided at the site, and storing the feature information for each API in a hierarchy to build an API database.

Additionally, extracting the API from the API list according to the frequency of occurrence of each API included in the API list in the malicious application apps or the benign application apps and generating the training dataset may include a step of labeling the API extracted from the API list as malicious or benign, acquiring, from the API database, the feature information corresponding to the API extracted from the API list, and generating the training dataset including the malicious or benign label and the feature information for each API extracted from the API list.

Additionally, inputting the pre-stored target API into the API classifier to classify the target API as malicious or benign may include a step of colleting the feature information corresponding to the target API from the API database, and inputting the feature information corresponding to the target API into the API classifier to classify as malicious or benign.

In addition, there may be provided a computer-readable recording medium having recorded thereon a computer program for performing the method of application malware detection based on dynamic API extraction.

Meanwhile, an apparatus for application malware detection based on dynamic API extraction according to the present disclosure includes an API extraction unit which extracts API used in a sample application classified as malicious application apps or benign application apps and generates an API list, a training dataset generation unit which extracts API from the API list according to frequency of occurrence of each API included in the API list in the malicious application apps or the benign application apps and generates a training dataset, and an API classifying unit which generates an API classifier using a machine learning algorithm with the training dataset and classifies an input API as malicious or benign, and inputs a pre-stored target API into the API classifier to classify the target API as malicious or benign.

Meanwhile, the training dataset generation unit may include an API counter unit which measures the frequency of occurrence of each API included in the API list in the malicious application apps or the benign application apps according to whether the sample application from which each API included in the API list is extracted is classified as malicious application apps or benign application apps, and an MI vector generation unit which calculates an MI value between the frequency of occurrence of each AP included in the API list in the malicious application apps and the frequency of occurrence in the benign application apps, and extracts the API that constitutes the training dataset from the API list on the basis of the MI value of each API included in the API list.

Additionally, the apparatus for application malware detection based on dynamic API extraction may further include an API metadata collection unit which accesses a reference site of an Android application, collects feature information including a package name, a class name, an API name and description for each API provided at the site, and stores the feature information for each API in a hierarchy to build an API database.

Additionally, the API classifying unit may acquire the feature information corresponding to the target API from the API database, and input the feature information corresponding to the target API into the API classifier to classify as malicious or benign.

According to the present disclosure, it is possible to evaluate the actual behaviors of applications more accurately by detecting security vulnerability of the applications based on feature information from APIs.

Additionally, according to the present disclosure, it is possible to objectively present security vulnerability of applications prior to using the corresponding applications on mobile devices, and prevent damage caused by malicious activities on the mobile devices.

DETAILED DESCRIPTION OF EMBODIMENTS

Figure 1:
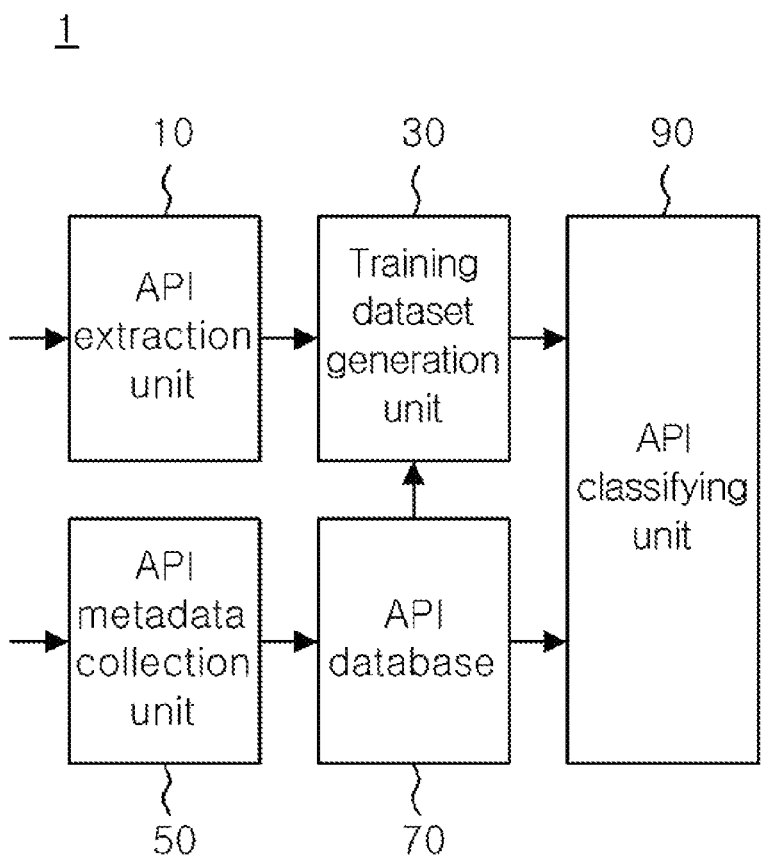
FIG. 1 is a block diagram of an apparatus for application malware detection based on dynamic Application Programming Interface (API) extraction according to an embodiment of the present disclosure.

The following detailed description of the present disclosure is made with reference to the accompanying drawings, in which particular embodiments for practicing the present disclosure is shown for illustration purposes. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment can be embodied in other embodiments without departing from the spirit and scope of the present disclosure. It should be further understood that changes can be made to positions or placement of individual elements in each disclosed embodiment without departing from the spirit and scope of the present disclosure. Therefore, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

The term "unit" is defined herein as having its broadest definition to an ordinary skill in the art to refer to a software including instructions executable in a non-transitory computer readable medium that would perform the associated function when executed, a circuit designed to perform the associated function, a hardware having a processor and a memory designed to perform the associated function, or a combination of a software, a circuit, or a hardware designed to perform the associated function.

FIG. 1 is a block diagram of an apparatus for application malware detection based on dynamic Application Programming Interface (API) extraction according to an embodiment of the present disclosure.

Referring to FIG. 1, the apparatus 1 for application malware detection based on dynamic API extraction according to an embodiment of the present disclosure may include an API extraction unit 10, a training dataset generation unit 30, an API metadata collection unit 50, an API database 70 and an API classifying unit 90.

The apparatus 1 for application malware detection based on dynamic API extraction according to an embodiment of the present disclosure may be implemented by a larger number of components than the components shown in FIG. 1, and may be implemented by a smaller number of components.

The apparatus 1 for application malware detection based on dynamic API extraction according to an embodiment of the present disclosure is an apparatus capable of inputting and outputting information, software (application) for application malware detection may be installed and run on the apparatus 1, and the API extraction unit 10, the training dataset generation unit 30, the API metadata collection unit 50 and the API classifying unit 90 shown in FIG. 1 may be controlled by the software running on the apparatus 1 for application malware detection based on dynamic API extraction according to an embodiment of the present disclosure.

The apparatus 1 for application malware detection based on dynamic API extraction according to an embodiment of the present disclosure may detect application malware by generating an API classifier that uses a machine learning algorithm with API feature information of an application and classifies API of the application as malicious or benign, and classifying API of an application running on an Android operating system-based mobile device as malicious or benign using the API classifier. Its brief description will be provided with reference to FIG. 2.

Figure 2:
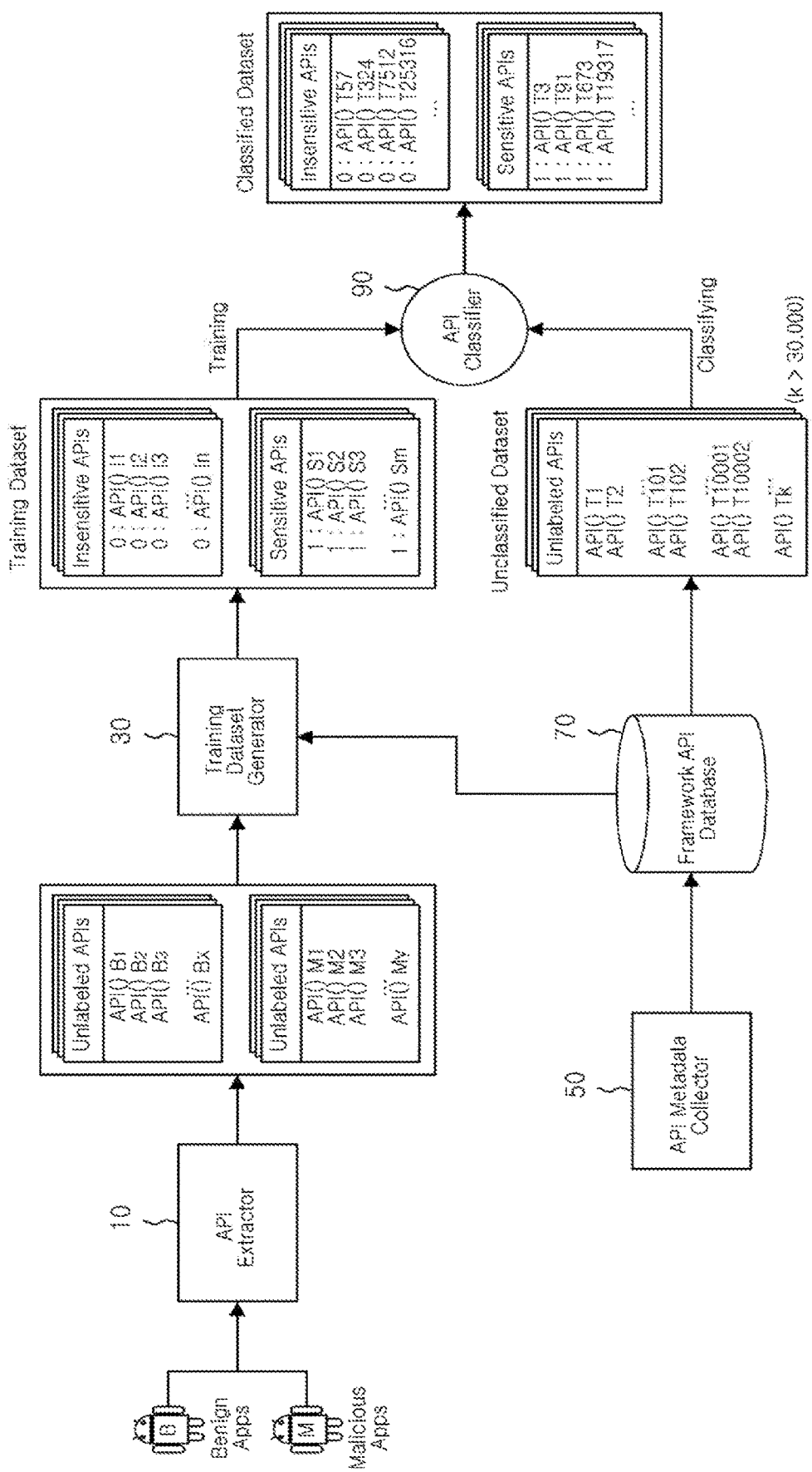
FIG. 2 is a schematic diagram illustrating a malware detection method in the malware detection apparatus shown in FIG. 1.

FIG. 2 is a schematic diagram illustrating a malware detection method in the malware detection apparatus shown in FIG. 1.

Referring to FIG. 2, the API extraction unit 10 may extract API used in a sample application classified as benign apps or malicious apps.

The API metadata collection unit 50 may collect feature information for each API provided at a reference site of an Android application and build the API database 70. In this embodiment, the feature information of the API may include the API name, the name of package to which the API belongs, the name of class to which the API belongs, and description of the API.

The training dataset generation unit 30 may select API that will be used to train an API classifier among the APIs extracted by the API extraction unit 10, label the selected API as malicious (1) or benign (0), and gather feature information corresponding to the selected API from the API database 70, and generate a training dataset.

The API classifying unit 90 may learn a machine learning algorithm with the training dataset and generate an API classifier. The API classifying unit 90 may input feature information of API used in a particular application into the API classifier to classify the corresponding API as malicious or benign.

The apparatus 1 for application malware detection based on dynamic API extraction according to an embodiment of the present disclosure may clearly analyze security vulnerability of the application based on the API feature information of the application. Accordingly, the apparatus 1 for application malware detection based on dynamic API extraction according to an embodiment of the present disclosure may objectively present security vulnerability of the application prior to using the corresponding application on the mobile device, and prevent damage caused by malicious activities on the mobile device.

Hereinafter, each component of the apparatus 1 for application malware detection based on dynamic API extraction according to an embodiment of the present disclosure as shown in FIG. 1 will be described in detail.

The API extraction unit 10 may extract API used in a sample application and generate an API list.

The sample application may be pre-classified as malicious apps or benign apps. When the sample application contains malware and does malicious activities, the sample application will be classified as malicious apps, and when the sample application does not contain malware, the sample application will be classified as benign apps.

For example, the API list may include the names of APIs used in the sample application.

The training dataset generation unit 30 may select API that will be used to build an API classifier from the API list generated by the API extraction unit 10 and generate a training dataset.

The training dataset generation unit 30 may select API that will be used to build an API classifier from the API list based on the frequency of occurrence of each API included in the API list in malicious apps or benign apps. Its detailed description will be provided with reference to FIG. 3 below.

The API metadata collection unit 50 may collect feature information for each API from a reference site of an Android application and build the API database 70.

As described above, the feature information for each API may include, for a certain API, the API name, the name of package to which the API belongs, the name of class to which the API belongs and description of the API.

The reference site of the Android application may provide feature information for each API used in all Android applications.

The API metadata collection unit 50 may access the reference site of the Android application, collect feature information for each API, and store the feature information for each API in a hierarchy to build the API database 70. Its detailed description will be provided with reference to FIG. 4 below.

The API database 70 may be built, in which the feature information for each API is stored in a hierarchy by the API metadata collection unit 50.

For example, the API database 70 may include a package table, a class table and a method table. The API database 70 may store classes belonging to each package according to the package type, and store all APIs belonging to each class according to the class type.

Meanwhile, the training dataset generation unit 30 may select API that will be used to build an API classifier from the API list generated by the API extraction unit 10, label the selected API as malicious or benign, gather feature information of the selected API from the API database 70, and generate a training dataset.

For example, the training dataset generation unit 30 may hierarchically acquire the description of the API selected from the API list, the names of class to which the API belongs and the name of package to which the API belongs from the API database 70 based on the name of the corresponding API.

The API classifying unit 90 may learn or classify the feature information of the API. In this instance, because the feature information of the API is in the form of a character string, the API classifying unit 90 may generate vectors for each word indicating the feature information of the API via natural language processing, and learn or classify each vector.

The API classifying unit 90 may learn the training dataset generated by the training dataset generation unit 30 using a machine learning algorithm and generate an API classifier that classifies APIs as malicious or benign. For example, the machine learning algorithm may be a decision tree algorithm.

Additionally, the API classifying unit 90 may input the feature information of all the APIs stored in the API database 70 into the API classifier to classify each API as malicious or benign. That is, the API classifying unit 90 may classify and present APIs of all applications provided at the reference site of the Android application as malicious or benign. For example, the API classifying unit 90 may generate the feature information of each API stored in the API database 70 into a target dataset, and input the target dataset into the API classifier to classify the corresponding target dataset as malicious or benign. Its detailed description will be provided with reference to FIG. 5 below.

Figure 3:
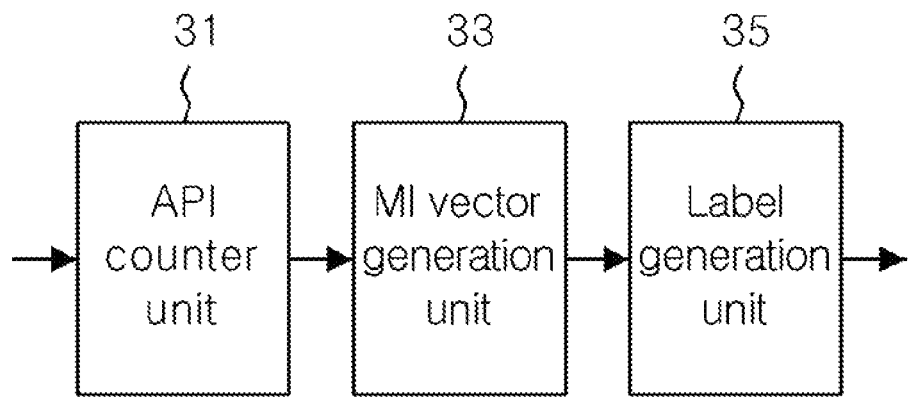
FIG. 3 is a detailed block diagram of a training dataset generation unit shown in FIG. 1.

FIG. 3 is a detailed block diagram of the training dataset generation unit shown in FIG. 1.

Referring to FIG. 3, the training dataset generation unit 30 may include an API counter unit 31, a Mutual Information (MI) vector generation unit 33 and a label generation unit 35.

The API counter unit 31 may measure the frequency of occurrence of each API in malicious apps or benign apps according to whether sample applications from which each API included in the API list is extracted are classified as malicious apps or benign apps.

For example, the API counter unit 31 may pre-store the total number of sample applications classified as malicious apps and the total number of sample applications classified as benign apps.

For a certain API included in the API list, when the corresponding API is extracted, the API counter unit 31 may identify whether the sample application is classified as malicious apps or benign apps.

For a certain API included in the API list, when the sample application from which the corresponding API is extracted is classified as malicious apps or benign apps, the API counter unit 31 may count the number of times in each case.

When API extraction from all the sample applications is completed, for a certain API included in the API list, the API counter unit 31 may measure the frequency of occurrence of the corresponding API in malicious apps by dividing the number of times the sample application from which the corresponding API is extracted is classified as malicious apps by the total number of sample applications classified as malicious apps.

When API extraction from all the sample applications is completed, for a certain API included in the API list, the API counter unit 31 may measure the frequency of occurrence of the corresponding API in benign apps by dividing the number of times the sample application from which the corresponding API is extracted is classified as benign apps by the total number of sample applications classified as benign apps.

As described above, the API counter unit 31 may measure the frequency of occurrence of each API included in the API list in malicious apps and the frequency of occurrence in benign apps.

The MI vector generation unit 33 may calculate an MI value between the frequency of occurrence of each API included in the API list in malicious apps and the frequency of occurrence in benign apps. Here, the MI value corresponds to an MI vector.

The MI value corresponds to a value obtained by measuring MI between two variables and quantifying an amount of information.

The MI vector generation unit 33 may determine the sensitivity of API based on the MI value between the frequency of occurrence of the API in malicious apps and the frequency of occurrence in benign apps. That is, as the MI value is larger, the API is more sensitive.

The MI vector generation unit 33 may select API that will constitute a training dataset from the API list based on the MI value of each API included in the API list.

For example, the MI vector generation unit 33 may select a preset number of APIs in a descending order of MI value as API that will constitute a training dataset from the API list, or may select API having the MI value that is equal to or larger than a preset value as API that will constitute a training dataset from the API list.

The label generation unit 35 may label the API selected as the API that will constitute a training dataset from the API list as malicious or benign.

For example, the label generation unit 35 may compare the frequency of occurrence of the API selected from the API list in malicious apps and the frequency of occurrence in benign apps. When the frequency of occurrence of the API selected from the API list in malicious apps is higher than the frequency of occurrence in benign apps, the label generation unit 35 may label the corresponding API as malicious, and in the contrary case, may label as benign.

The label generation unit 35 may acquire, from the API database 70, feature information of the API selected from the API list to constitute a training dataset.

The label generation unit 35 may label the API selected from the API list as malicious or benign, and include each feature information to generate a training dataset.

Figure 4:
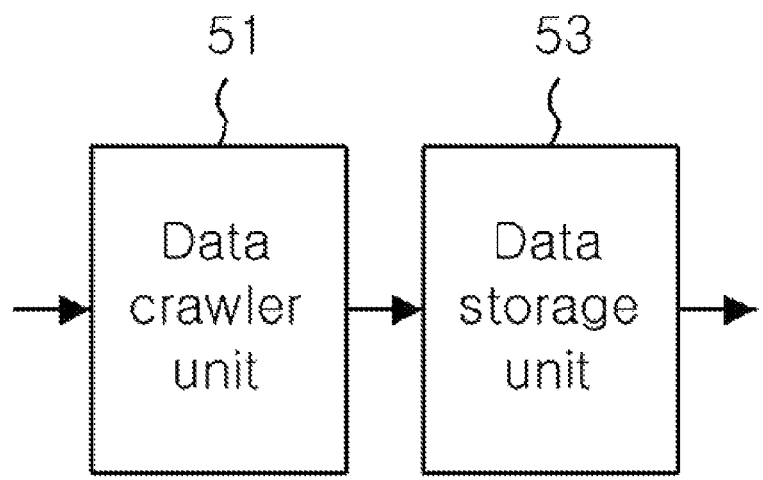
FIG. 4 is a detailed block diagram of an API metadata collection unit shown in FIG. 1.

FIG. 4 is a detailed block diagram of the API metadata collection unit shown in FIG. 1.

Referring to FIG. 4, the API metadata collection unit 50 may include a data crawler unit 51 and a data storage unit 53.

The data crawler unit 51 may access a reference site of an Android application, and collect feature information of all APIs provided at the Android reference site.

For example, the data crawler unit 51 may parse feature information of APIs provided at the reference site of the Android application using html parsing libraries.

The data storage unit 53 may store the feature information of the APIs collected by the data crawler unit 51 in a hierarchy to build the API database 70.

The data storage unit 53 may construct the API database 70 including a package table, a class table and a method table, and store classes belonging to each package according to the package type and all APIs belonging to each class according to the class type.

Figure 5:
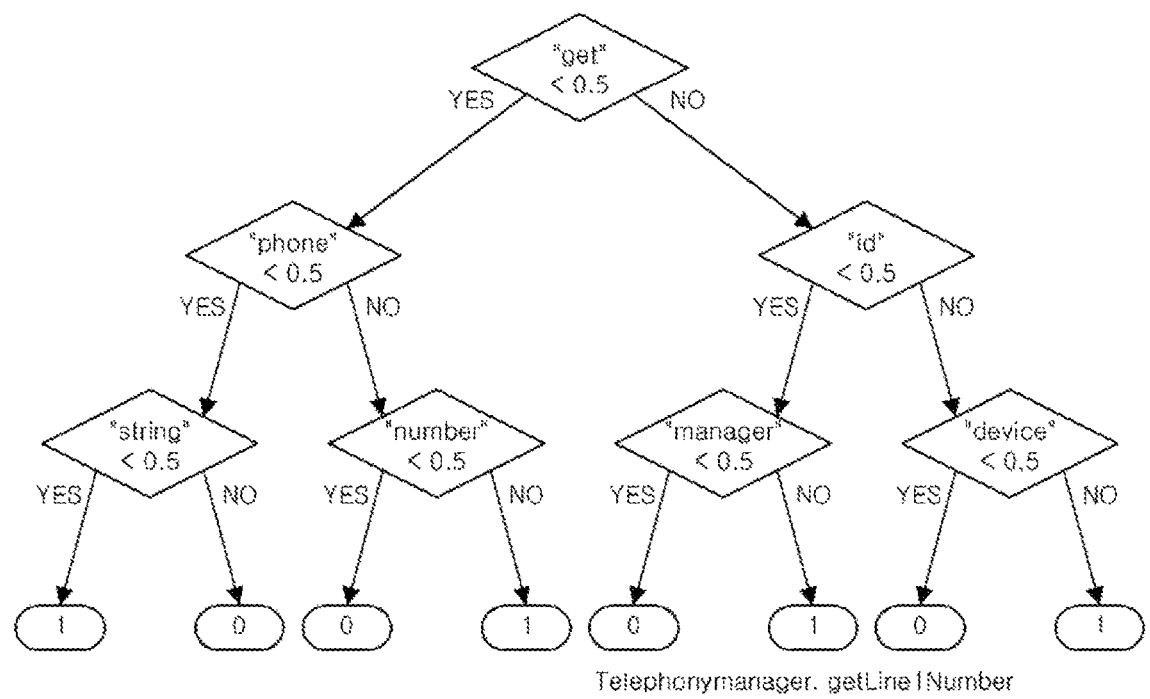
FIG. 5 is a diagram showing an example of API classification in an API classifying unit shown in FIG. 1.

FIG. 5 is a diagram showing an example of API classification in the API classifying unit shown in FIG. 1.

Referring to FIG. 5, the API classifying unit 90 may learn a training dataset as malicious or benign, or classify a target dataset as malicious or benign. As described above, the training dataset may include the feature information of the API extracted from the sample application, and the target dataset may include the feature information of the API stored in the API database 70.

The API classifying unit 90 may learn the training dataset using a decision tree algorithm and generate an API classifier that classifies feature information of API inputted as shown in FIG. 5 as benign (0) or malicious (1).

For example, when the target dataset includes feature information corresponding to "getLine1Number", the following table 1 is given.

TABLE 1

| | |
|---|---|
| API name | getLine1Number |
| Package to which API belongs | android.telephony |
| Class to which API belongs | Telephonymanager |
| Description of API | Returns the phone number string for line 1, for example, the MSISDN for a GSM phone. |
| Feature information used in classification | telephony, manager, get, line, number, return, phone, example, msisdn, gsm |

Referring to Table 1, because the feature information of the API is in the form of a character string, the API classifying unit 90 may perform a natural language processing and vectorization for each word indicating the API feature information.

The API classifying unit 90 may vectorize the feature information shown in Table 1 like {x1, x2, . . . , x10}={telephony, manager, . . . , gsm}, and input it into the API classifier.

When the classification result of the feature information using the API classifier is calculated as "1", the API classifying unit 90 may classify the API having the corresponding feature information as malicious, and when the classification result of the feature information is calculated as "0", the API classifying unit 90 may classify the API having the corresponding feature information as benign.

In the case of "getLine1Number", the classification result of the API classifier is calculated as "1", and thus the corresponding API will be classified as malicious.

Hereinafter, a method of application malware detection based on dynamic API extraction according to an embodiment of the present disclosure will be described.

The method of application malware detection based on dynamic API extraction according to an embodiment of the present disclosure may be performed under substantially the same configuration as the apparatus 1 for application malware detection based on dynamic API extraction according to an embodiment of the present disclosure as shown in FIG. 1. Accordingly, the same components as the apparatus 1 of FIG. 1 are given the same reference signs, and redundant descriptions are omitted herein.

Figure 6:
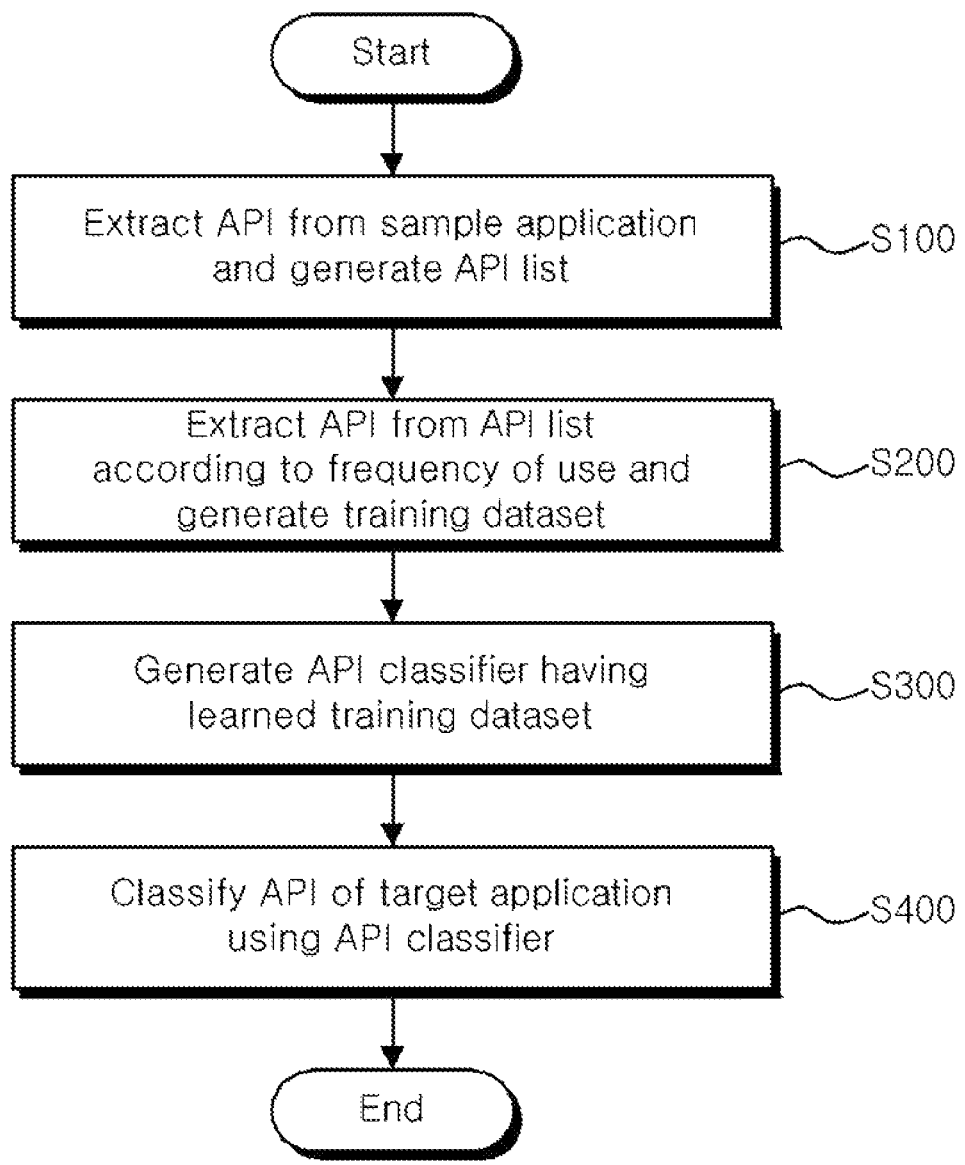
FIG. 6 is a flowchart of a method of application malware detection based on dynamic API extraction according to an embodiment of the present disclosure.

FIG. 6 is a flowchart of the method of application malware detection based on dynamic API extraction according to an embodiment of the present disclosure.

Referring to FIG. 6, the API extraction unit 10 may extract API from a sample application and generate an API list (S100).

The sample application may be pre-classified as malicious apps or benign apps. When the sample application contains malware and does malicious activities, the sample application will be classified as malicious apps, and when the sample application does not contain malware, the sample application will be classified as benign apps.

The training dataset generation unit 30 may extract API from the API list according to the frequency of use and generate a training dataset (S200).

The training dataset generation unit 30 may select API that will be used to build an API classifier from the API list generated by the API extraction unit 10 and generate a training dataset.

The training dataset generation unit 30 may select API that will be used to build an API classifier from the API list based on the frequency of occurrence of each API included in the API list in malicious apps or benign apps. In this instance, the training dataset generation unit 30 may select API that will be used to build an API classifier from the API list based on an MI value between the frequency of occurrence of the API in malicious apps and the frequency of occurrence in benign apps.

The training dataset generation unit 30 may label the API selected from the API list as malicious or benign, and include each feature information to generate a training dataset.

The API classifying unit 90 may generate an API classifier having learned the training dataset (S300).

The API classifying unit 90 may learn the training dataset generated by the training dataset generation unit 30 using a machine learning algorithm and generate an API classifier that classifies APIs as malicious or benign. For example, the machine learning algorithm may be a decision tree algorithm.

The API classifying unit 90 may classify API of a target application using the API classifier (S400).

The API classifying unit 90 may input feature information of all APIs stored in the API database 70 into the API classifier to classify each API as malicious or benign. That is, the API classifying unit 90 may classify and present APIs of all applications provided at a reference site of an Android application as malicious or benign. For example, the API classifying unit 90 may generate feature information of each API stored in the API database 70 into a target dataset, and input the target dataset into the API classifier to classify the corresponding target dataset as malicious or benign.

The method of application malware detection based on dynamic API extraction according to the present disclosure as described above may be implemented as an application or in the form of program commands that may be executed through various computer components and may be recorded in computer-readable recording media. The computer-readable recording media may include program commands, data files and data structures, and alone or in combination.

The program commands recorded in the computer-readable recording media may be specially designed and configured for the present disclosure, and may be those known and available to those having ordinary skill in the field of computer software.

Examples of the computer-readable recording media include hardware devices specially designed to store and execute program commands, for example, magnetic media such as hard disk, floppy disk and magnetic tape, optical media such as CD-ROM and DVD, magneto-optical media such as floptical disk, and ROM, RAM and flash memory.

Examples of the program command include machine code generated by a compiler as well as high-level language code that can be executed by a computer using an interpreter. The hardware device may be configured to act as one or more software modules to perform the processing according to the present disclosure, or vice versa.

While the present disclosure has been hereinabove described with reference to the embodiments, it will be appreciated by those having ordinary skill in the technical field pertaining to the present disclosure that various modifications and changes may be made thereto without departing from the spirit and scope of the present disclosure defined in the appended claims.

DETAILED DESCRIPTION OF MAIN ELEMENTS

1: Apparatus for application malware detection based on dynamic API extraction
10: API extraction unit
30: Training dataset generation unit
50: API metadata collection unit
70: API database
90: API classifying unit

What is claimed is:

1. A malware detection method of a malware detection apparatus based on dynamic Application Programming Interface (API) extraction, the malware detection method comprising:
   extracting a certain API from a sample application of a plurality of sample applications, the sample application is classified as belonging to malicious apps or benign apps, and generating an API list including a plurality of APIs;
   extracting the certain API from the API list according to a frequency of occurrence of each API of the plurality of APIs included in the API list in the malicious apps or the benign apps, and generating a training dataset;
   learning by a machine learning algorithm with the training dataset and generating an API classifier which classifies an input API as malicious or benign; and
   inputting a pre-stored target API into the API classifier to classify the pre-stored target API as malicious or benign,
   wherein the extracting the certain API from the API list according to the frequency of occurrence of the each API of the plurality of APIs included in the API list in the malicious apps or the benign apps and the generating the training dataset comprises:
measuring the frequency of occurrence of the each API of the plurality of APIs included in the API list in the malicious apps or the benign apps according to whether the sample application of the plurality of sample applications from which the each API of the plurality of APIs included in the API list is extracted is classified as belonging to the malicious apps or the benign apps;
calculating a Mutual Information (MI) value between the frequency of occurrence in the malicious apps and the frequency of occurrence in the benign apps of the each API of the plurality of APIs included in the API list; and
determining a sensitivity of the certain API based on the MI value of the each API of the plurality of APIs included in the API list and extracting the certain API that constitutes the training dataset from the API list based on the sensitivity of the certain API,
wherein the measuring the frequency of occurrence of the each API of the plurality of APIs included in the API list in the malicious apps or the benign apps according to whether the sample application of the plurality of sample applications from which the each API of the plurality of APIs included in the API list is extracted is classified as belonging to the malicious apps or the benign apps comprises:
when the certain API is extracted from the sample application of the plurality of sample applications, counting a number of times where the sample application of the plurality of sample applications from which a corresponding API is extracted is classified as belonging to the malicious apps and counting a number of times where the sample application of the plurality of sample applications from which the corresponding API is extracted is classified as belonging to the benign apps; and
when API extraction from all of the plurality of sample applications is completed for the certain API included in the API list, measuring the frequency of occurrence of the corresponding API in the malicious apps by dividing the number of times where the sample application of the plurality of sample applications from which the corresponding API is extracted is classified as belonging to the malicious apps by a total number of the plurality of sample applications classified as belonging to the malicious apps,
wherein the training dataset is composed of a target dataset in a form of a character string, the target dataset is inputted into the API classifier to classify the target dataset as malicious or benign, and the target dataset is hierarchically stored in an API database, and wherein the machine learning algorithm is a decision tree algorithm.

2. The malware detection method of claim 1, further comprising:
accessing a reference site of an Android application, and collecting feature information including a package name, a class name, an API name, and description for each API provided at the reference site; and
storing the feature information for the each API provided at the reference site in a hierarchy to build the API database.

3. The malware detection method of claim 2, wherein the extracting the certain API from the API list according to the frequency of occurrence of the each API of the plurality of APIs included in the API list in the malicious apps or the benign apps and the generating the training dataset further comprises:
labeling the certain API extracted from the API list as malicious or benign;
acquiring, from the API database, feature information corresponding to the certain API extracted from the API list; and
generating the training dataset including malicious or benign label and feature information for each API extracted from the API list.

4. The malware detection method of claim 3, wherein the inputting the pre-stored target API into the API classifier to classify the pre-stored target API as malicious or benign comprises:
acquiring feature information corresponding to the pre-stored target API from the API database; and
inputting the feature information corresponding to the pre-stored target API into the API classifier to classify as malicious or benign.

5. A non-transitory computer-readable recording medium having recorded thereon a computer program for performing application malware detection based on dynamic Application Programming Interface (API) extraction, the computer program including instructions that when executed by a computer cause the computer to perform operations comprising:
extracting a certain API from a sample application of a plurality of sample applications, the sample application is classified as belonging to malicious apps or benign apps, and generating an API list including a plurality of APIs;
extracting the certain API from the API list according to a frequency of occurrence of each API of the plurality of APIs included in the API list in the malicious apps or the benign apps, and generating a training dataset;
learning by a machine learning algorithm with the training dataset and generating an API classifier which classifies an input API as malicious or benign; and
inputting a pre-stored target API into the API classifier to classify the pre-stored target API as malicious or benign,
wherein the extracting the certain API from the API list according to the frequency of occurrence of the each API of the plurality of APIs included in the API list in the malicious apps or the benign apps and the generating the training dataset comprises:
measuring the frequency of occurrence of the each API of the plurality of APIs included in the API list in the malicious apps or the benign apps according to whether the sample application of the plurality of sample applications from which the each API of the plurality of APIs included in the API list is extracted is classified as belonging to the malicious apps or the benign apps;
calculating a Mutual Information (MI) value between the frequency of occurrence in the malicious apps and the frequency of occurrence in the benign apps of the each API of the plurality of APIs included in the API list; and
determining a sensitivity of the certain API based on the MI value of the each API of the plurality of APIs included in the API list and extracting the certain API that constitutes the training dataset from the API list based on the sensitivity of the certain API,
wherein the measuring the frequency of occurrence of the each API of the plurality of APIs included in the API list in the malicious apps or the benign apps according to whether the sample application of the plurality of sample applications from which the each API of the plurality of APIs included in the API list is extracted is classified as belonging to the malicious apps or the benign apps comprises:
when the certain API is extracted from the sample application of the plurality of sample applications, counting a number of times where the sample application of the plurality of sample applications from which a corresponding API is extracted is classified as belonging to the malicious apps and counting a number of times where the sample application of the plurality of sample applications from which the corresponding API is extracted is classified as belonging to the benign apps; and
when API extraction from all of the plurality of sample applications is completed for the certain API included in the API list, measuring the frequency of occurrence of the corresponding API in the malicious apps by dividing the number of times where the sample application of the plurality of sample applications from which the corresponding API is extracted is classified as belonging to the malicious apps by a total number of the plurality of sample applications classified as belonging to the malicious apps,
wherein the training dataset is composed of a target dataset in a form of a character string, the target dataset is inputted into the API classifier to classify the target dataset as malicious or benign, and the target dataset is hierarchically stored in an API database, and wherein the machine learning algorithm is a decision tree algorithm.

6. An apparatus for malware detection application based on dynamic Application Programming Interface (API) extraction, the apparatus comprising:
a processor and a memory;
an API extraction unit, stored in the memory and executed by the processor, which extracts a certain API used in a sample application of the plurality of sample applications, the sample application classified as belonging to malicious apps or benign apps and generates an API list including a plurality of APIs;
a training dataset generation unit, stored in the memory and executed by the processor, which extracts the certain API from the API list according to a frequency of occurrence of each API of the plurality of APIs included in the API list in the malicious apps or the benign apps and generates a training dataset; and
an API classifying unit, stored in the memory and executed by the processor, which generates an API classifier that learns by a machine learning algorithm with the training dataset and classifies an input API as malicious or benign, and inputs a pre-stored target API into the API classifier to classify the pre-stored target API as malicious or benign,
wherein the training dataset generation unit comprises:
an API counter unit, stored in the memory and executed by the processor, which measures the frequency of occurrence of the each API of the plurality of APIs included in the API list in the malicious apps or the benign apps according to whether the sample application of the plurality of sample applications from which the each API of the plurality of APIs included in the API list is extracted is classified as belonging to the malicious apps or the benign apps; and
a Mutual Information (MI) vector generation unit, stored in the memory and executed by the processor, which calculates an MI value between the frequency of occurrence in the malicious apps and the frequency of occurrence in the benign apps of the each API of the plurality of APIs included in the API list, determines a sensitivity of the certain API based on the MI value of the each API of the plurality of APIs included in the API list, and extracts the certain API that constitutes the training dataset from the API list based on the sensitivity of the certain API,
wherein when the certain API is extracted from the sample application of the plurality of sample applications, the API counter unit counts a number of times where the sample application of the plurality of sample applications from which a corresponding API is extracted is classified as belonging to the malicious apps and counts a number of times where the sample application of the plurality of sample applications from which the corresponding API is extracted is classified as belonging to the benign apps, and when API extraction from all of the plurality of sample applications is completed for the certain API included in the API list, the API counter unit measures the frequency of occurrence of the corresponding API in the malicious apps by dividing the number of times where the sample application of the plurality of sample applications from which the corresponding API is extracted is classified as belonging to the malicious apps by a total number of the plurality of sample applications classified as belonging to the malicious apps,
wherein the training dataset is composed of a target dataset in a form of a character string, the target dataset is inputted into the API classifier to classify the target dataset as malicious or benign, and the target dataset is hierarchically stored in an API database, wherein the machine learning algorithm is a decision tree algorithm.

7. The apparatus for malware detection application based on dynamic API extraction according to claim 6, further comprising:
an API metadata collection unit, stored in the memory and executed by the processor, which accesses a reference site of an Android application, collects feature information including a package name, a class name, an API name and description for each API provided at the reference site, and stores the feature information for the each API provided at the reference site in a hierarchy to build the API database.

8. The apparatus for malware detection application based on dynamic API extraction according to claim 7, wherein the API classifying unit acquires feature information corresponding to the pre-stored target API from the API database, and inputs the feature information corresponding to the pre-stored target API into the API classifier to classify as malicious or benign.

* * * * *